(12) United States Patent
Miao

(10) Patent No.: US 7,333,528 B1
(45) Date of Patent: Feb. 19, 2008

(54) MULTIUSER DSSS-OFDM MULTIBAND FOR ULTRA WIDEBAND COMMUNICATIONS

(76) Inventor: George J. Miao, 2 Inverness Dr., Marlboro, NJ (US) 07746

( * ) Notice: Subject to any disclaimer, the term of this patent is extended or adjusted under 35 U.S.C. 154(b) by 665 days.

(21) Appl. No.: 10/643,302

(22) Filed: Aug. 19, 2003

(51) Int. Cl.
*H04B 1/69* (2006.01)
(52) U.S. Cl. ...................................... 375/140; 375/130
(58) Field of Classification Search ................ 375/140, 375/260, 130, 240.27; 455/88, 68
See application file for complete search history.

(56) References Cited

U.S. PATENT DOCUMENTS 7,031,371 B1 * 4/2006 Lakkis ........................ 375/146
2004/0086027 A1 * 5/2004 Shattil ........................ 375/146

* cited by examiner

*Primary Examiner*—Khai Tran

(57) ABSTRACT

A multiuser direct sequence spread spectrum (DSSS) Orthogonal Frequency Division Multiplexing (OFDM) multiband of Ultra Wideband (UWB) communication system for short-distance wireless broadband communications is disclosed for indoor environment operations. Eleven frequency bands are employed, with each of the frequency bands having 650 MHz bandwidths. A 1024-point IFFT and FFT with 1,000 subcarriers are used to carry data and pilots within each of the frequency bands. The multiuser DSSS-OFDM multiband of the UWB communication system can transmit N different users at the same time by using a unique spreading sequence for each of the N different users. A QPSK modulation is used for a different data rate with scalability. The maximum transmitting data rate of the UWB communication system can achieve about 5.541 Gbps.

24 Claims, 15 Drawing Sheets

MULTIUSER DSSS-OFDM MULTIBAND FOR ULTRA WIDEBAND COMMUNICATIONS

BACKGROUND

This invention is generally relative to a multiuser direct sequence spread spectrum (DSSS) Orthogonal Frequency Division Multiplexing (OFDM) multiband based Ultra Wideband (UWB) Communications for short-distance wireless broadband communications.

U.S. Federal Communications Commission (FCC) released a revision of Part 15 of Commission's rules regarding UWB transmission systems to allow marketing and operation of certain types of new products incorporating UWB technology on Apr. 22, 2002. Using spectrums occupied by existing radio service, an UWB device can operate without causing interference, thereby permitting scarce spectrum resources to be used more efficiently. Thus, it is feasible that the UWB technology is able to provide significant benefits for Government, public safety, businesses and consumers within an operation spectrum.

In general, FCC is adapting unwanted emission limits for UWB communication devices that are significantly more stringent than those imposed on other Part 15 devices. In indoor environments of UWB operations, FCC allows a wide variety of the UWB communication devices, such as high-speed home and business networking devices, subject to certain frequency and power limitations. An emission limitation is −10 dBm for indoor UWB operations. The UWB communication devices must operate in the frequency band from 3.1 GHz to 10.6 GHz. In addition, the UWB communication devices should satisfy the Part 15.209 emission mask limitations for the frequency band below 960 MHz and above 960 MHz.

For the UWB communication devices operating in indoor environments, Table 1 lists FCC restrictions of the emission masks (dBm) along with the frequency bands (GHz) as follows:

TABLE 1

| Frequency (MHz) | EIRP (dBm) |
|---|---|
| 0-960 | −41.3 |
| 960-1610 | −75.3 |
| 1610-1990 | −53.3 |
| 1990-3100 | −51.3 |
| 3100-10600 | −41.3 |
| Above 10600 | −51.3 |

FCC defines an UWB communication device where a fractional bandwidth is greater than 0.25 given by, $$FB = 2\left(\frac{f_H - f_L}{f_H + f_L}\right), \quad (1)$$

where $f_H$ is the upper frequency of −10 dBm emission point, and $f_L$ is the lower frequency of −10 dBm emission point. The center frequency $F_c$ of an UWB transmission system is obtained by using average of the upper and lower −10 dBm points as follows:

$$F_C = \frac{f_H + f_L}{2}. \quad (2)$$

Furthermore, a minimum frequency bandwidth of 500 MHz must be used for any indoor UWB communication devices regardless of the center frequency.

As can be seen, the UWB communication devices must be designed in such a way that the indoor UWB operations can only occur in the indoor environments according to indoor UWB emission masks given in Table 1. The UWB communication devices can be used for wireless broadband communications, particularly for a short-range high-speed data transmission that can be considered as broadband access to networks.

Given an frequency band from 3.1 GHz to 10.6 GHz as a single frequency band, an analog-to-digital (A/D) converter and a digital-to-analog (D/A) converter must operate at a very high sampling rate $F_s$ so that an UWB communication receiver can be implemented in a digital domain. This leads to a high requirement for the A/D and D/A converters for UWB transmitter and receiver. Presently, developing such very high-speed A/D and D/A converters may not be possible with a reasonable cost. Thereby, it is a difficult problem to apply the A/D and the D/A converters directly for an UWB communication transceiver based on a single frequency band solution. On the other hand, a single frequency band-based UWB communication transceiver does not have a flexibility and scalability for transmitting and receiving a user data. In addition, the single frequency band-based UWB communication transceiver may have an interference with a wireless local area network (WLAN) 802.11a transceiver without using a special filter system or other approaches since the WLAN 802.11a transceiver operates at a lower U-NII frequency range from 5.15 GHz to 5.35 GHz and at an upper U-NII upper frequency range from 5.725 GHz to 5.825 GHz.

An OFDM is an orthogonal multicarrier modulation technique that has been extensively used in a digital audio and video broadcasting, and the WLAN 802.11a. The OFDM has its capability of multifold increasing symbol duration. With increasing the number of subcarriers, the frequency selectivity of a channel may be reduced so that each subcarrier experiences flat fading. Thus, an OFDM approach has been shown in a particular useful for wireless broadband communications over fading channels.

A DSSS approach is to use a pseudorandom (PN) sequence to spread a user signal. The PN sequence is a stream of binary ones and zeros referred to as chips rather than bits. The DSSS approach can be used to separate signals coming from multiusers. Multiple access interference (MAI) among multiusers can be avoided if a set of PN sequences is designed in such a way that a low crosscorrelation among the PN sequences is obtained.

The multiuser DSSS-OFDM multiband for UWB communications is disclosed herein according to some embodiments of the present invention. The present invention uses eleven frequency bands as a multiband, each of the frequency bands having 650 MHz bandwidths along with OFDM modulation for a multiuser UWB communication transceiver. A multiband OFDM solution allows using a low speed of the A/D and D/A converters. Moreover, a unique of the PN sequences is assigned to each user so that the multiusers can share the same each of the frequency bands to transmit and receive data based on OFDM multiband of UWB technologies. On the other hand, since the OFDM is an orthogonal multicarrier modulation, subcarriers within each of the frequency bands may be flexibility turned on or off. This can lead to avoid the interference with the WLAN 802.11a transceiver during the indoor UWB operations. In addition, the present invention of the multiuser DSSS- OFDM multiband for UWB communications has a scalability to transmit and receive from a data rate of 503.732 Mbps by using only one of the frequency bands to the data rate of 5.541 Gbps by using all of the eleven frequency bands (or a multiband).

Thus, there is a continuing need of the multiuser DSSS-OFDM multiband for an UWB communication transceiver employing an new architecture of the PN sequences, OFDM multicarrier multiband, and filtering for the indoor UWB operations.

SUMMARY

In accordance with one aspect, a multiuser DSSS-OFDM multiband of UWB communication transmitter may comprise a multiuser encoding and spreading unit, a multiband splitter, an inverse fast Fourier transform (IFFT) unit, a filtering unit, and a multiband multicarrier modulation.

Other aspects are set forth in the accompanying detailed description and claims.

DETAILED DESCRIPTION

Some embodiments described herein are directed to the multiuser DSSS-OFDM multiband of an UWB communication system for the indoor UWB operations. The multiuser DSSS-OFDM multiband of UWB communication system may be implemented in hardware, such as in an Application Specific Integrated Circuits (ASIC), digital signal processor, field programmable gate array (FPGA), software, or a combination of hardware and software.

Multiuser DSSS-OFDM Multiband of UWB System

Figure 1:
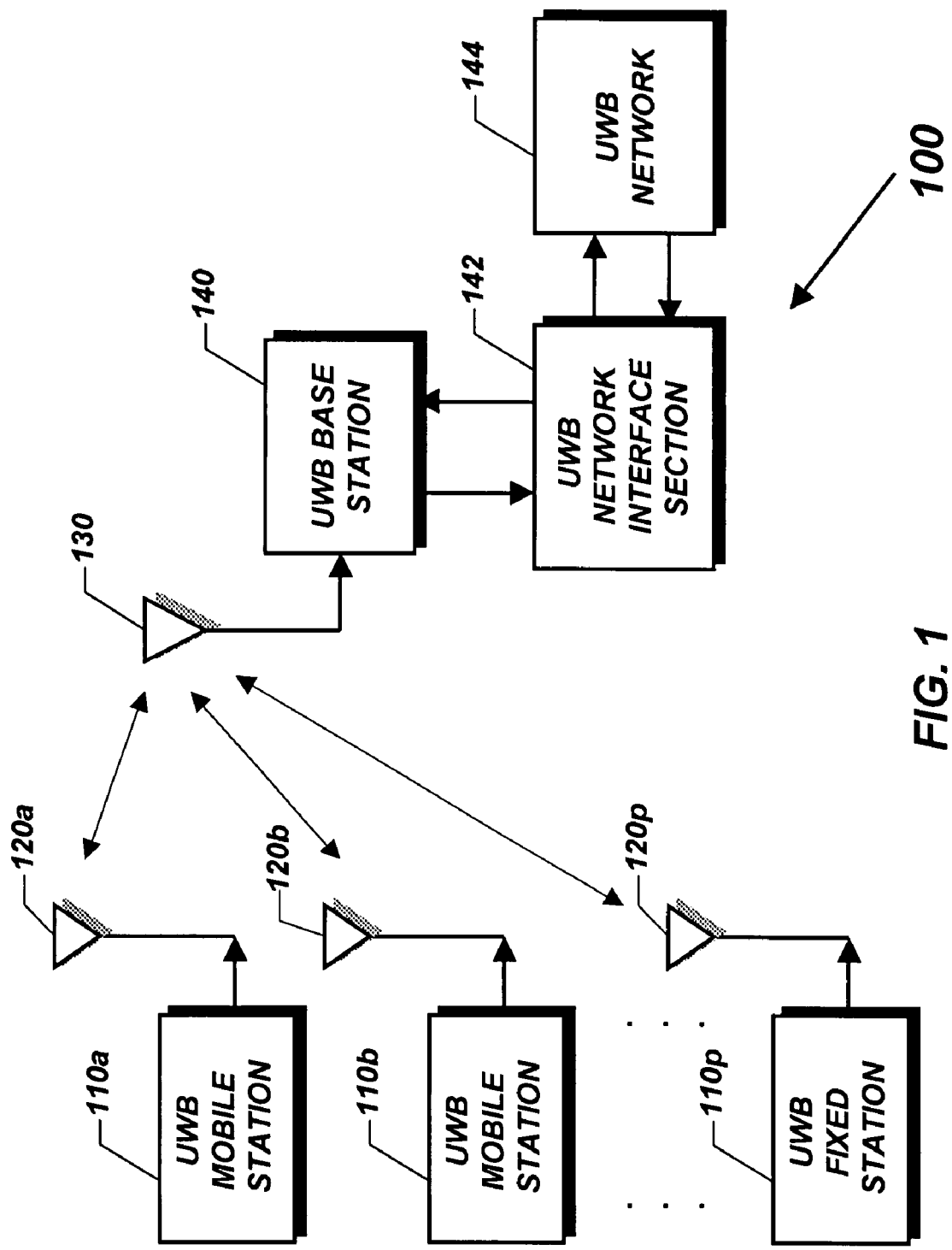
FIG. 1 is a block diagram of a multiuser DSSS-OFDM multiband of UWB communication system with different user UWB mobile stations and a single UWB base station according to some embodiments.

A multiuser DSSS-OFDM multiband of UWB communication system 100 for the indoor UWB operations is illustrated in FIG. 1 in accordance with one embodiment of the present invention. UWB mobile stations from 110a to 110p can communicate with an UWB base station 140 to transmit and receive information data through the frequency bands in an indoor environment simultaneously. An UWB mobile station 110a transmits and receives the data through its antenna 120a into air, and communicates with the UWB base station 140 through an antenna 130. In a similar way, other UWB mobile stations from 110b to 110p also transmits and receives the data through their antennas from 120b to 120p, respectively, and communicate with the UWB base station 140 through the antenna 130 as well. The UWB base station 140 is coupled to an UWB network interface section 142 that is connected with an UWB network 144.

Each of the UWB mobile stations from 110a to 110p uses a unique PN sequence to spread and despread a user source signal. Knowing all of the PN sequences of the UWB mobile stations from 110a to 110p, the UWB base station 140 can transmit and receive all of the data from all of the UWB mobile stations from 110a to 110p based on an OFDM multiband solution by spreading and despreading of user PN sequences, respectively. The multiuser DSSS-OFDM multiband of the UWB communication system uses a QPSK modulation and multicarrier within each of the frequency bands to transmit and receive a data rate of 503.732 Mbps on one single frequency band up to the data rate of 5.541 Gbps on all of the eleven frequency bands. As a result, the multiuser DSSS-OFDM multiband of the UWB communication system 100 can transmit and receive a maximum data rate at 5.541 Gbps by using all of the eleven frequency bands simultaneously.

UWB Base Station Transmitter Architecture

Figure 2:
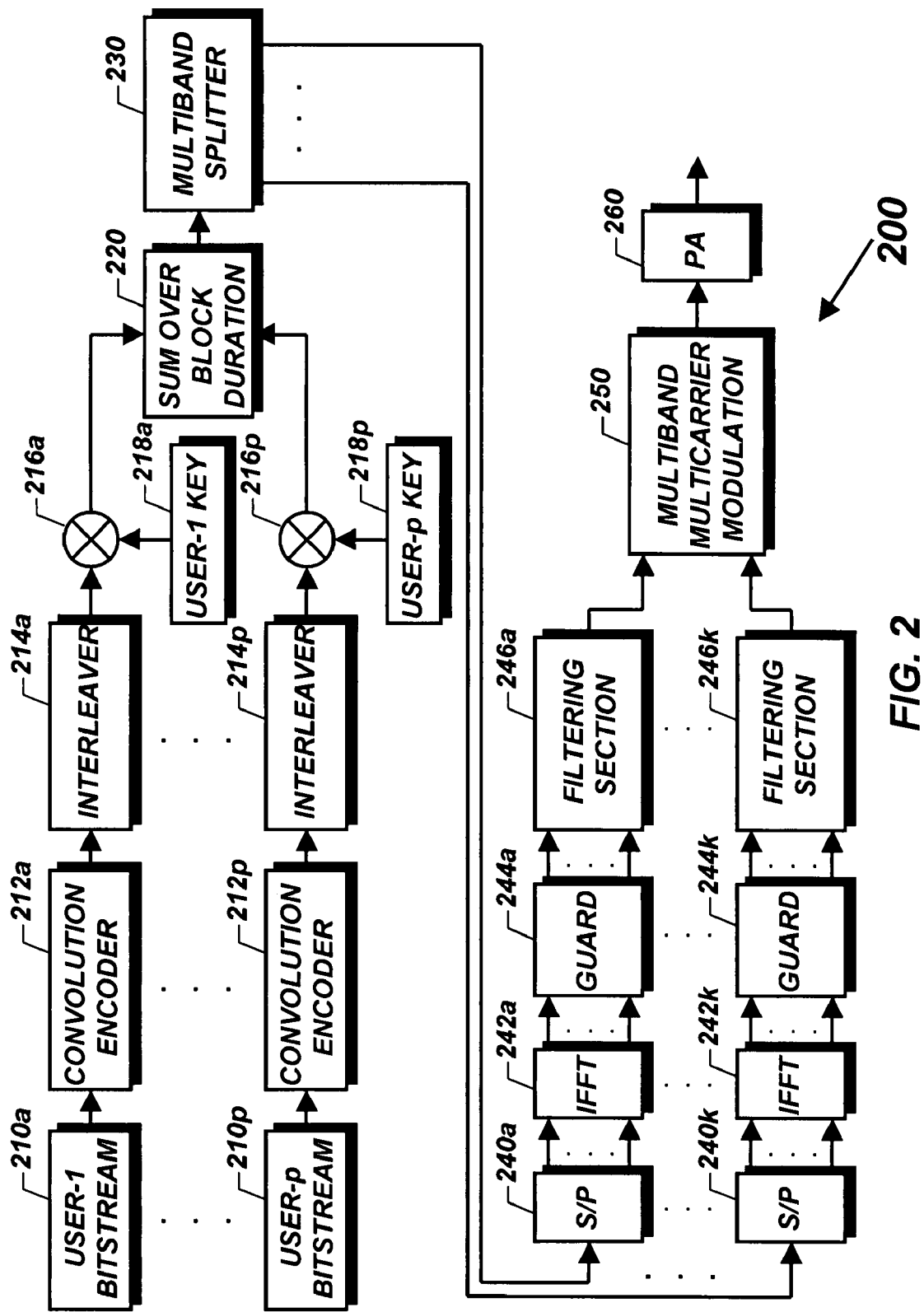
FIG. 2 is a block diagram of a multiuser DSSS-OFDM multiband for an UWB base station communication transmitter according to some embodiments.

FIG. 2 is a block diagram of the multiuser DSSS-OFDM multiband of UWB base station transmitter architecture 200 for the indoor UWB operations according to some embodiments. There are a number of p users from a user-1 bitstream 210a to a users bitstream 210p, respectively. The user-1 bitstream 210a is coupled to a ½-rate convolution encoder 212a, which is connected to an interleaver 214a. Using the unique PN sequence of a user-1 key 218a spreads the output sequence of the interleaver 214a. In a similar way, the users bitstream 210p is coupled to a ½-rate convolution encoder 212p that is connected to an interleaver 214p. Using the unique PN sequence of a user-p key 218p spreads the output sequence of the interleaver 214p. In addition, all of the PN sequences are orthogonal each other. This means that a cross-correlation between one PN sequence and other PN sequences is almost zero, while a self-correlation of a user PN sequence is almost equal to one. Then, the p output sequences from the interleaver 214a to the interleaver 214p in a parallel operation are added together to form a serial sequence output by using a sum over block duration 220. The serial output of the sum over block duration 220 is converted into eleven parallel sequences by using a multi-band splitter 230 (see the detail illustration of the multiband splitter 230 in FIG. 3). Thus, the first of the output sequence from the multiband splitter is converted into a 512-parallel sequence by suing an serial-to-parallel (S/P) 240a. The 512-parallel sequence is formed to 512-parallel complex sequence with a symmetric conjugate. The 512-parallel complex sequence is passed through an IFFT 242a to produce a 1024-parallel real sequence. The IFFT 242a is coupled to a guard 244a to insert 256 samples as a guard interval for the output sequence of the IFFT 242a. As a result, the output of the guard 244a is a 1280-parallel real sequence. Then, the 1280-parallel real sequences are passed through a filtering section 246a to produce even and odd modulated signal sequences. Carriers multiply the even and odd modulated signal sequences of the filtering section 246a by using a multiband multicarrier modulation 250. In the same way, the eleventh of the output sequence from the multiband splitter 230 is converted into a 512-parallel sequence by suing an S/P 240k. The 512-parallel sequence is formed to 512-parallel complex sequence with the symmetric conjugate. The 512-parallel complex sequence is passed through an IFFT 242k to produce a 1024-parallel real sequence. The IFFT 242k is coupled to a guard 244k to insert 256 samples as a guard interval for the output sequence of the IFFT 242k. Thus, the output of the guard 244k is a 1280-parallel real sequence. The guard interval is used to avoid an intersymbol interference (ISI) between IFFT frames. Then, the 1280-parallel real sequences are passed through a filtering section 246k to produce even and odd modulated signal sequences. Carriers multiply the even and odd modulated signal sequences of the filtering section 246k by using a multiband multicarrier modulation 250. Finally, the eleven paralleled output signal sequences of the multiband multicarrier modulation 250 are added together and passed through a power amplifier (PA) 260 into air.

Figure 3:
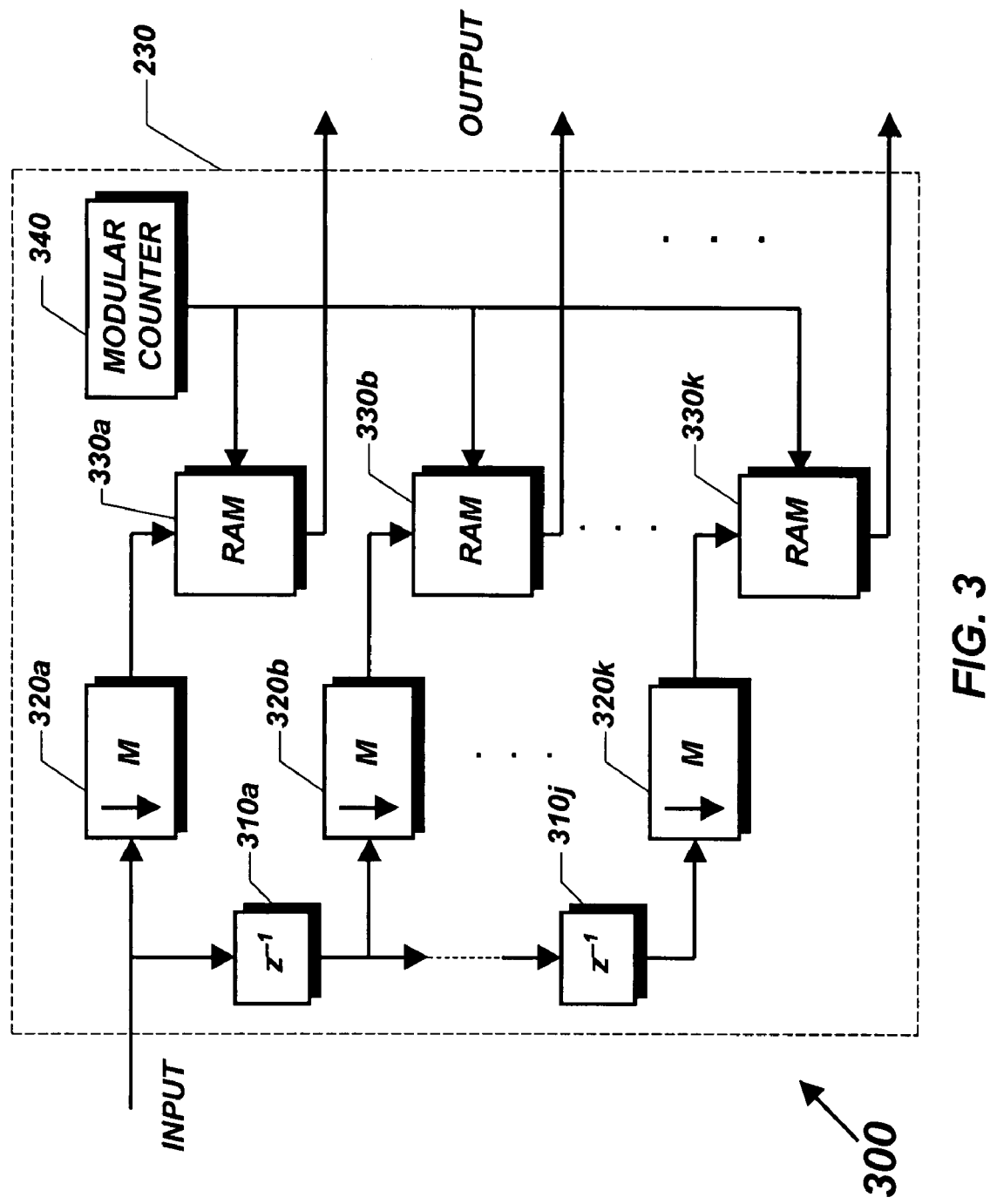
FIG. 3 is a detailed block diagram of a multiband splitter according to some embodiments.

Referring to FIG. 3 is a detailed block diagram 300 of a multiband splitter (230) architecture according to some embodiments. The multiband splitter (230) architecture includes ten sample delay units from 310a to 310k, eleven down sample units from 320a to 320k, eleven random access memory (RAM) units from 330a to 330k, and a modular counter 340. An input sequence of a length of N data is divided into eleven parallel sequences with a length of N/11 data by using the sample delays from 310a to 310j and the down samples of 320a to 320k. The eleven output sequences of the down sample units from 320a to 320k are stored into RAM memories of 330a to 330k. A row size of each of the RAM units from 330a to 330k is 512 and the number of bits in each row can be programmed. A modular counter is used to control an address of the RAM units from 330a to 330k for storing input sequence and sending out output sequence.

Figure 4:
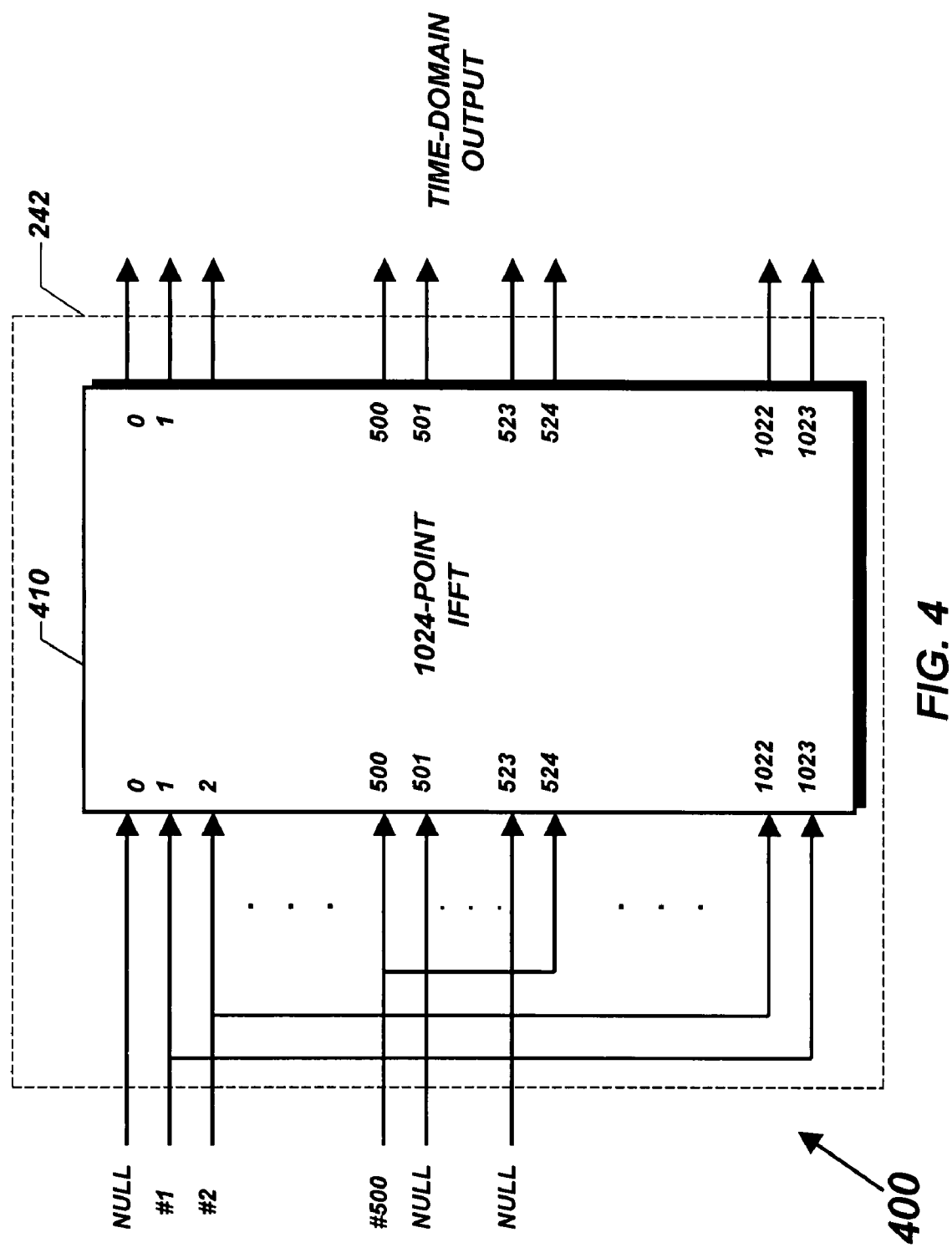
FIG. 4 is a detailed block of a 1024-point IFFT employing 1000 subcarriers and 24 NULLs according to some embodiments.

Referring to FIG. 4 is a detailed block diagram 400 of a 1024-point IFFT 410 (242) according to some embodiments. There are 24 Nulls including #0 (DC), and #501 to #523. The rest of the input #0 (DC) and #501 to #523 are set to zero. The coefficients from 1 to 500 are mapped to the same numbered IFFT inputs from #1 to #500, while the coefficients from 500 to 1 are also copied into IFFT inputs from #524 to #1023 to form a complex conjugate. Thus, there are a total of 1,000 subcarriers for transmitting data and pilot information. In order to make a coherent detection robust against frequency offsets and phase noise, eight of the 1,000 subcarriers are dedicated to pilot signals that are assigned into the subcarriers of #100, #200, #300, #400, and #624, #724, #824, and #924. These pilots are binary phase-shift keying (BPSK) modulated by a pseudo binary sequence to prevent a generation of spectral lines. In this case, other 992 subcarriers of each OFDM are dedicated to assign for transmitting data information. After performing a 1024-point IFFT, an output of the 1024-point IFFT is cyclically extended to a desired length in each of the multiband.

Table 2 lists data rate-dependent parameters of the 1024-point IFFT operation for each of the frequency bands.

TABLE 2

| Data rate (Mbits/s) | Modulation | Coding rate | Coded bits per subcarrier | Coded bits per OFDM symbol | Data bits per OFDM symbol |
| --- | --- | --- | --- | --- | --- |
| 503.732 | QPSK | ½ | 2 | 1983.998 | 991.999 |

Table 3 shows the 1024-point IFFT of timing-related parameters for each of the frequency bands.

TABLE 3

| Parameters | Descriptions | Value |
| --- | --- | --- |
| $N_{ds}$ | Number of data subcarriers | 992 |
| $N_{ps}$ | Number of pilot subcarriers | 8 |
| $N_{ts}$ | Number of total subcarriers | 1000 |
| $D_{fs}$ | Frequency spacing for subcarrier (650 MHz/1024) | 0.6347 MHz |
| $T_{FFT}$ | IFFT/FFT period (1/$D_{fs}$) | 1.5755 μs |
| $T_{gd}$ | Guard duration ($T_{FFT}/4$) | 0.3938 μs |
| $T_{signal}$ | Duration of the signal BPSK-OFDM symbol ($T_{FFT} + T_{gd}$) | 1.9693 μs |
| $T_{sym}$ | Symbol interval ($T_{FFT} + T_{gd}$) | 1.9693 μs |
| $T_{short}$ | Short duration of training sequence (10 × $T_{FFT}/4$) | 3.938 μs |
| $T_{gd2}$ | Training symbol guard duration ($T_{FFT}/2$) | 0.7877 μs |
| $T_{long}$ | Long duration of training sequence (2 × $T_{FFT} + T_{gd2}$) | 3.938 μs |
| $T_{preamble}$ | Physical layer convergence procedure preamble duration ($T_{short} + T_{long}$) | 7.876 μs |

Figure 5:
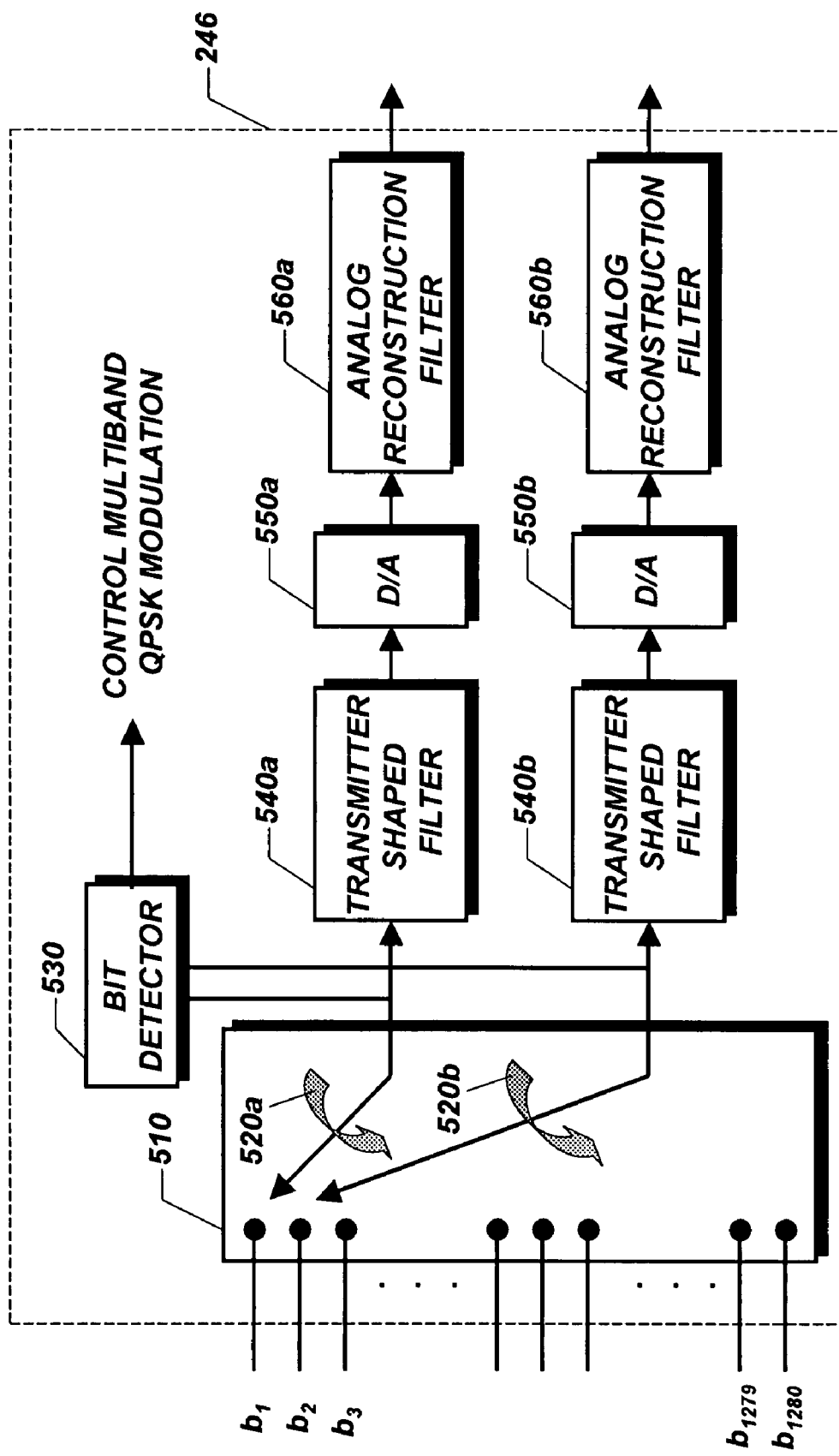
FIG. 5 is a detailed block diagram of a filtering section according to some embodiments.

FIG. 5 is a detailed block diagram 500 of a filtering section (246) according to some embodiments. A switch unit 510 including two switches of 520a and 520b is used to split a serial data sequence into two parallel data sequences with an even and an odd number, respectively. The switch 520a rotates to the even number of data (for example, $b_2$, $b_4$, $b_6$, . . . ) to form a serial even data sequence, and the switch 520b rotates to the odd number of data (for example, $b_1$, $b_3$, $b_5$, . . . ) to form a serial odd data sequence. Using a transmitter shaped filter 540a to shape a transmitter spectrum and limit the frequency band filters serial even sequences of the switch 520a output. The output of the transmitter shaped filter 540a is passed through a D/A converter 550a, which is coupled to an analog reconstruction-filter 560a. The analog reconstruction-filter 560a does a smooth of signal of the D/A converter 550a output. In the same way, using a transmitter shaped filter 540b to shape the transmitter spectrum and limit the frequency band filters output of the serial odd sequences of the switch 520b. The output of the transmitter shaped filter 540b is passed through a D/A converter 550b that is coupled to an analog reconstruction-filter 560b. The analog reconstruction-filter 560b does smooth of the signal of the D/A converter 550b. A bit detector 530 identifies a value data either "0" or "1" from the output of the switch 520*a* and the switch 520*b*. The bit detector 530 is used to control a multiband QPSK modulation.

Figure 6:
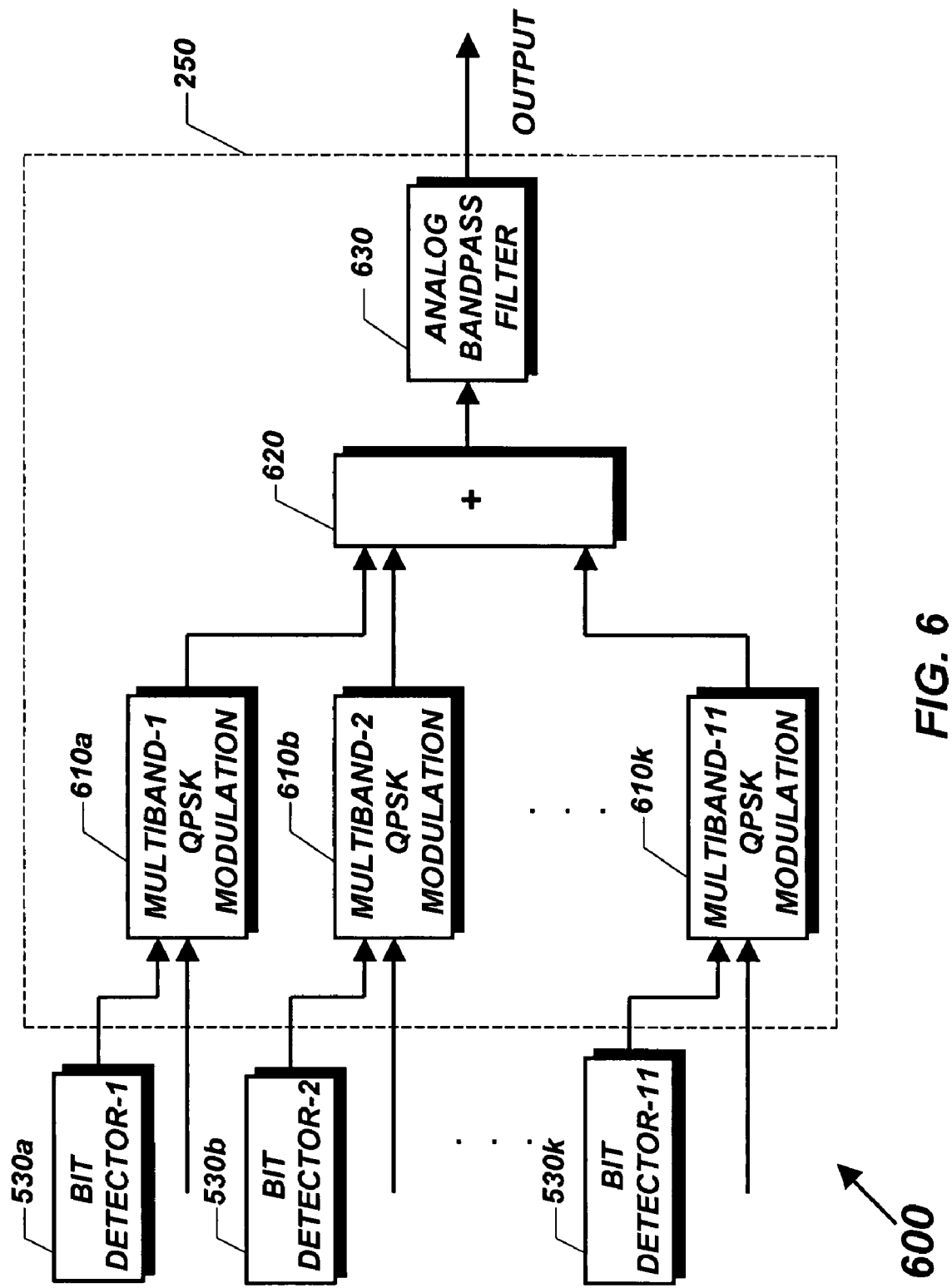
FIG. 6 is a detailed block diagram of a multiband multicarrier modulation according to some embodiments.

Referring to FIG. 6 is a detailed block diagram 600 of a multiband multicarrier modulation (250) according to some embodiments. Eleven analog signals of the output of the analog reconstruction-filters in parallel are passed through eleven multiband QPSK modulations from 610*a* to 610*k* in parallel. The bit detectors from 530*a* to 530*k* are used to control the multiband QPSK modulations from 610*a* to 610*k*, respectively. The output signals of the multiband QPSK modulations from 610*a* to 610*k* are coherently added together by using a sum unit 620. Then, the output of the sum unit 620 is passed through an analog bandpass filter 630 to produce bandlimited signals for an UWB communication transmitter.

Figure 7:
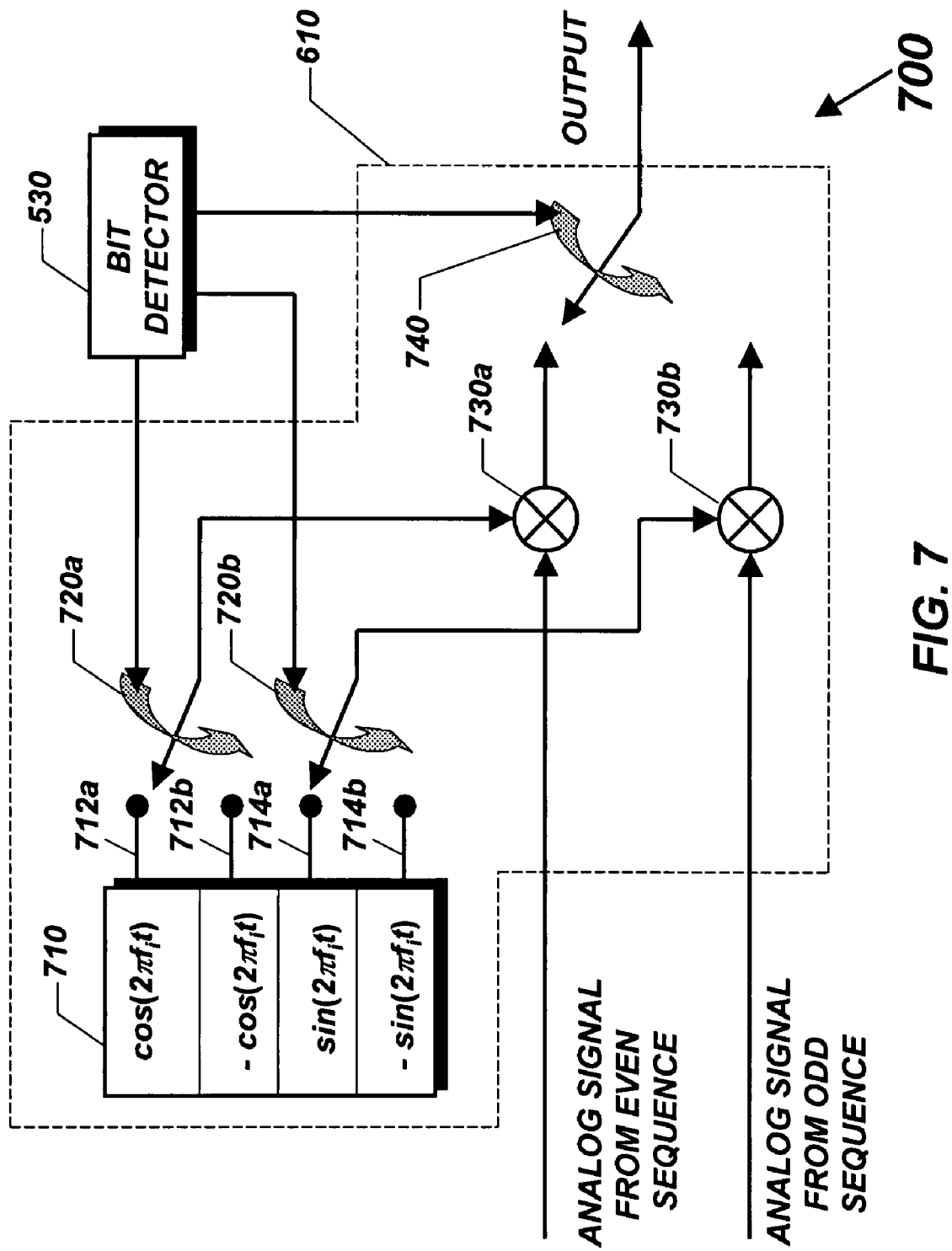
FIG. 7 is a detailed block diagram of a multiband quadrature phase shift keying (QPSK) modulation according to some embodiments.

Referring to FIG. 7 is a detailed block diagram 700 of a multiband QPSK modulation (610) according to some embodiments. The analog signals from the even and odd sequences in parallel are multiplied with carriers from an output of a multi-oscillator 710 by using multiplier units from 730*a* and 730*b*. The multi-oscillator 710 contains four carriers: $\sin(2\pi f_c t)$, $-\sin(2\pi f_c t)$, $\cos(2\pi f_c t)$, and $-\cos(2\pi f_c t)$. A switch 720*a* is used to connect with either a position of 712*a* or a position of 712*b*. In the same way, a switch 720*b* is used to connect with either a position of 714*a* or a position of 714*b*. Using the bit detector 530 (as shown in FIG. 6) controls both of the switches 720*a* and 720*b*. The switch 720*a* connects to the position of 712*a* when the bit detector 530 identifies "00" bits from the output of the switches 520*a* and 520*b* as shown in FIG. 5. The switch 720*a* connects to the position of 712*b* when the bits detector 530 identifies "10" bits from the output of the switches 520*a* and 520*b* in FIG. 5. In a similar way, the switch 720*b* connects to the position of 714*b* if the bit detector 530 identifies "01" bits from the output of the switches 520*a* and 520*b* in FIG. 5. The switch 720*b* connects to the position of 714*a* if the bit detector 530 identifies "11" bits from the output of the switches 520*a* and 520*b* in FIG. 5. Then, a switch 740 rotates either a position of 730*a* or a position of 730*b*. The bit detector 530 also controls the switch 740. When the bit detector 530 identifies either "00" or "10" bits from the output of the switches 520*a* and 520*b*, the switch 740 connects to the position of 730*a*. When the bit detector 530 identifies either "01" or "11" bits from the output of the switches 520*a* and 520*b*, the switch 740 connects to the position of 730*b*. In this case, the outputs of the switch 740 are a QPSK modulation.

Figure 8:
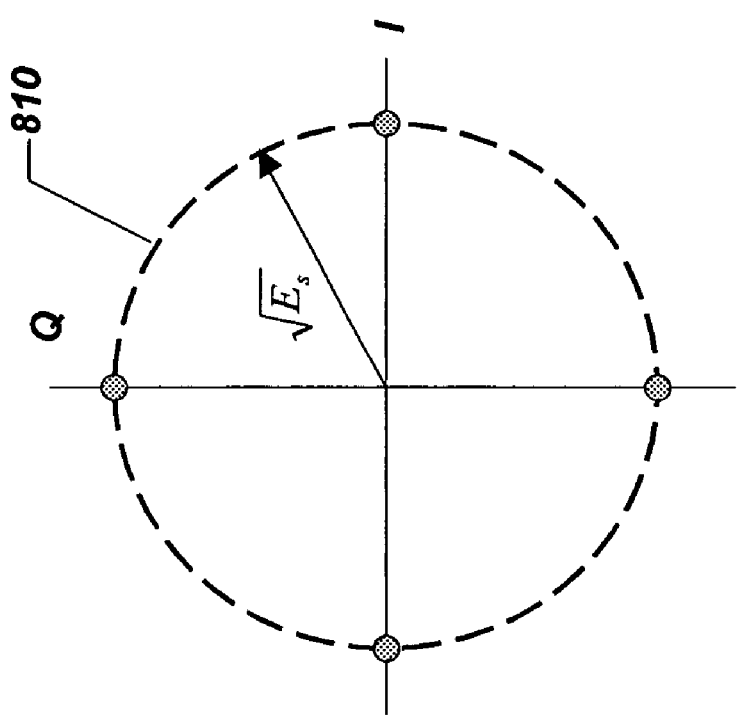
FIG. 8 is a detailed QPSK constellation with a mapping relationship of bits and phases.

Referring to FIG. 8 is a detailed QPSK mapping relationship 800 according to two-bit information. A QPSK constellation 810 contains four mapping points, two points on the I-axis and tow points on the Q-axis. A mapping relationship of a bit pattern and a phase 820 contains four bit patterns along with corresponding four-phase information. The bit patterns of "00", "01", "10", and "11" represent "0", "$\pi/2$", "$\pi$", and "$3\pi/2$" phases, respectively.

Output Spectrum of UWB Base Station Transmitter

Figure 9:
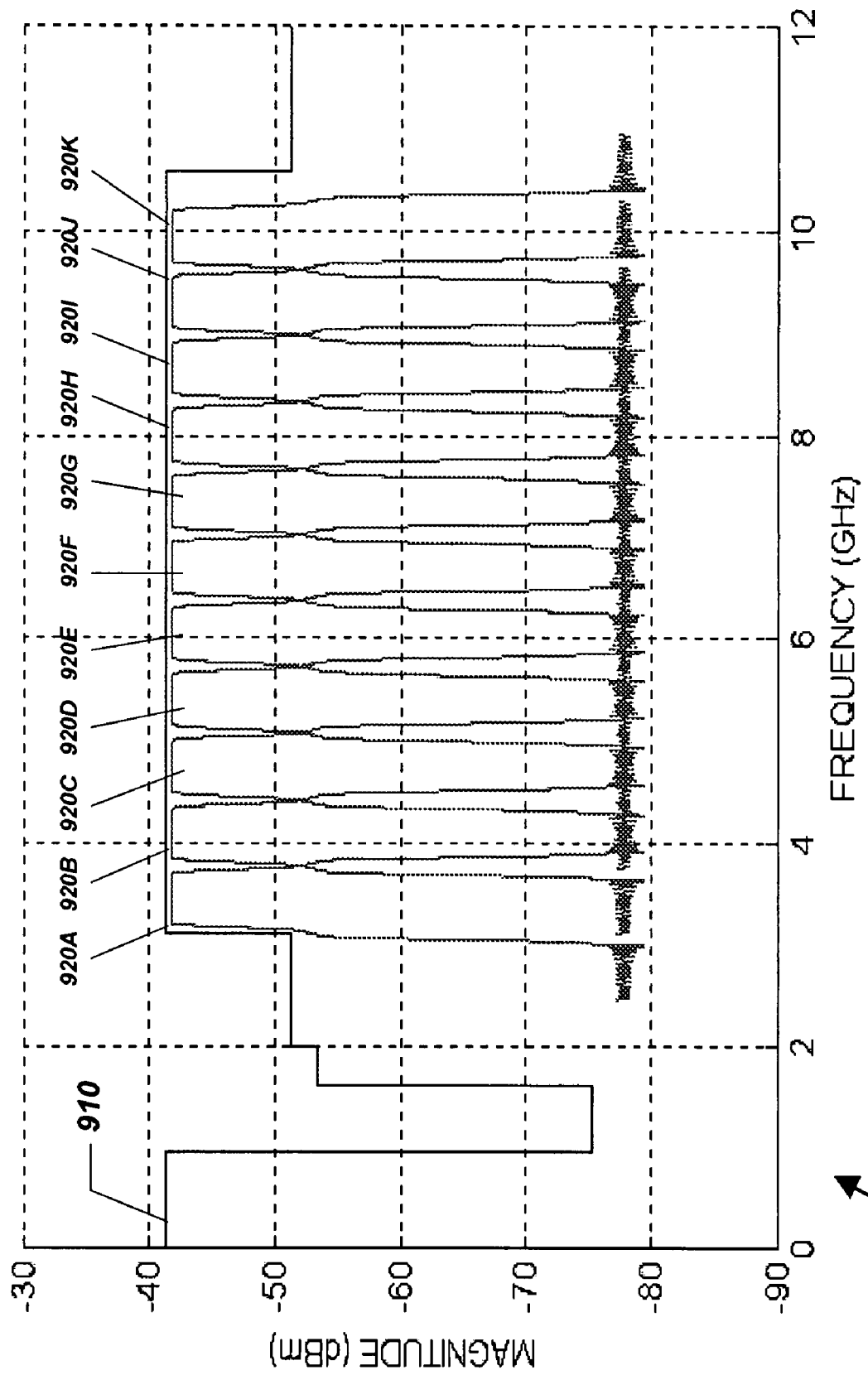
FIG. 9 is a frequency spectrum output of the multiuser DSSS-OFDM multiband of the UWB base station communication transmitter for the indoor UWB operations according to one embodiment.

FIG. 9 is an output frequency spectrum 900 of the multiuser DSSS-OFDM multiband of UWB base station communication transmitter, including eleven frequency band spectrums from 920A to 920K according to some embodiments. A FCC emission limitation 910 of the indoor UWB operations is also shown in FIG. 9. Each frequency bandwidth of the eleven frequency band spectrums from 920A to 920K for a transmitter is 650 MHz with different carrier frequencies under the FCC emission limitation 910. The detail positions of the frequency band spectrums (dBm) for the UWB communication transmitter along with the center, lower and upper frequencies (GHz) as well as corresponding channel frequency bandwidth (MHz) are listed in Table 4:

TABLE 4

| Multichannel Label | Center Frequency (GHz) | Lower Frequency (GHz) | Upper Frequency (GHz) | Frequency Bandwidth (MHz) |
|---|---|---|---|---|
| 920A | 3.45 | 3.125 | 3.775 | 650 |
| 920B | 4.10 | 3.775 | 4.425 | 650 |
| 920C | 4.75 | 4.425 | 5.075 | 650 |
| 920D | 5.40 | 5.075 | 5.725 | 650 |
| 920E | 6.05 | 5.725 | 6.375 | 650 |
| 920F | 6.70 | 6.375 | 7.025 | 650 |
| 920G | 7.35 | 7.025 | 7.675 | 650 |
| 920H | 8.00 | 7.675 | 8.325 | 650 |
| 920I | 8.65 | 8.325 | 8.975 | 650 |
| 920J | 9.30 | 8.975 | 9.625 | 650 |
| 920K | 9.95 | 9.625 | 10.275 | 650 |

During the indoor UWB operation, the fourth and/or fifth frequency band (labeled with 920D and/or 920E in FIG. 9) of the multiuser DSSS-OFDM multiband of UWB base station transmitters can be turned off in order to avoid an interference with a WLAN 802.11a lower U-NII frequency band and/or upper U-NII frequency band. In some cases, the multiuser DSSS-OFDM of the UWB base station and mobile transmitters can further turn off some subcarriers within the OFDM in the fourth and/or fifth frequency band if the WLAN 802.11a only uses certain subchannels in the lower U-NII or in the upper U-NII frequency bands.

UWB Mobile Receiver Architecture

Figure 10:
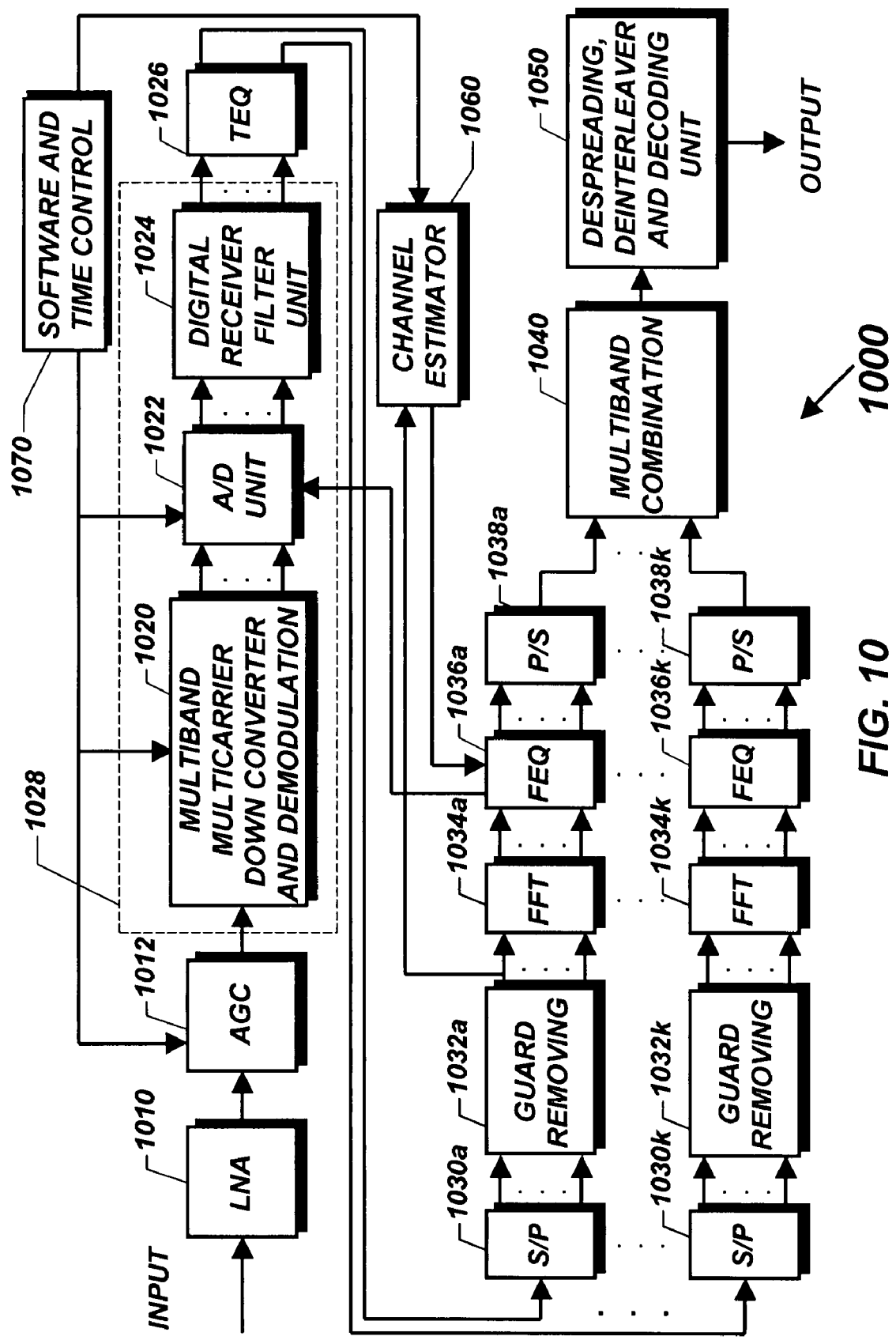
FIG. 10 is a block diagram of a multiuser DSSS-OFDM multiband of an UWB mobile communication receiver for a single user according to some embodiments.
Figure 14:
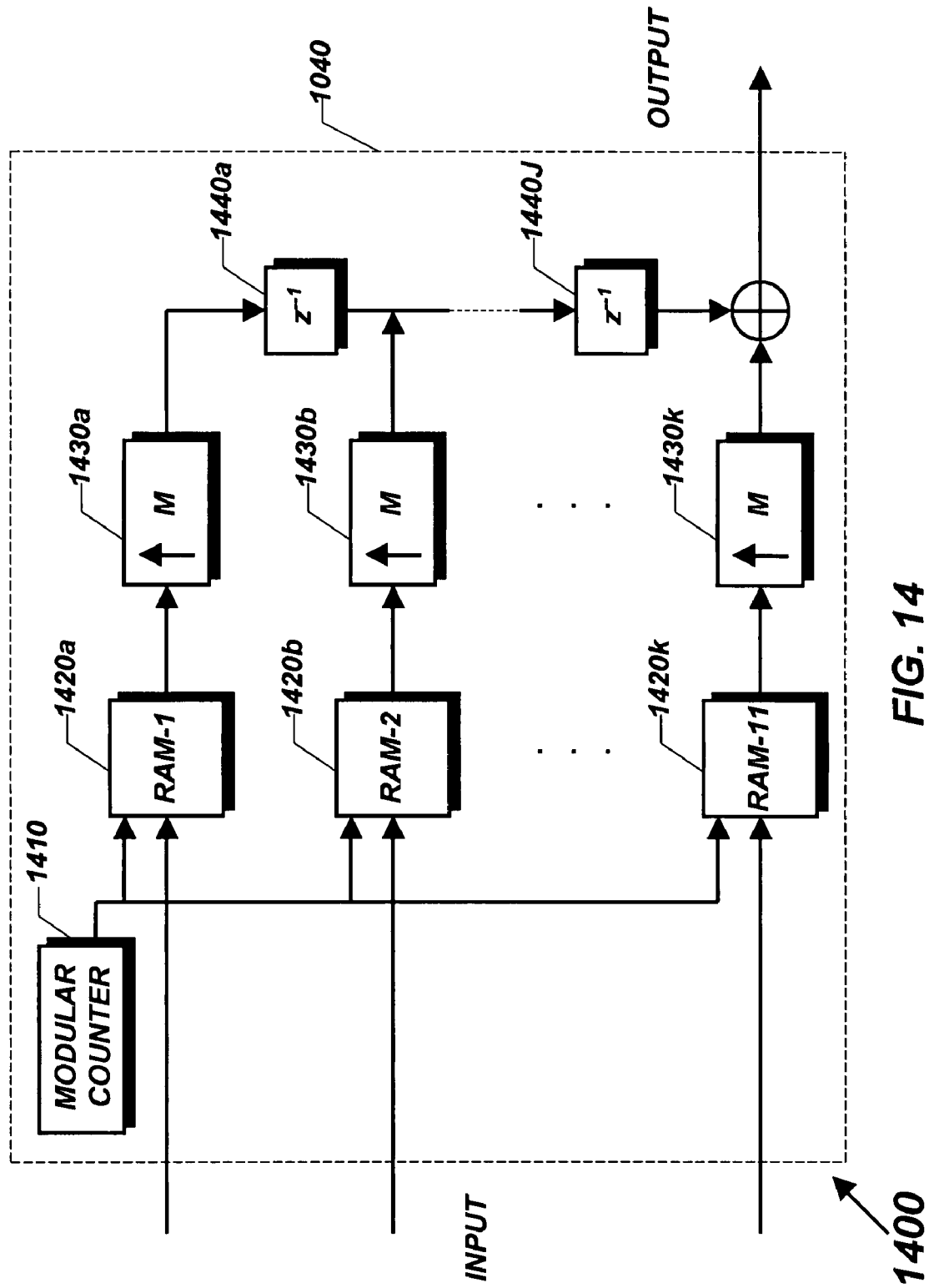
FIG. 14 is a detailed block diagram of a multiband combination according to some embodiments.

FIG. 10 is a block diagram of a DSSS-OFDM multiband of UWB mobile communication receiver 1000 for the indoor UWB operations according to some embodiments. A low noise amplifier (LNA) 1010, which is coupled to an automatic gain control (AGC) 1012, receives the multiuser DSSS-OFDM multiband-based UWB signals from an antenna 130 (as shown in FIG. 1). The output of the LNA 1010 is passed through the AGC 1012 to adjust amplitude of the multiuser DSSS-OFDM multiband-based UWB signals for a multiband multicarrier down converter and demodulation 1020. The eleven bandlimited multiuser DSSS-OFDM multiband of UWB analog signals of an output multiband multicarrier down converter and demodulation 1220 are in parallel sampled and quantized by using an A/D converter unit 1022, with a sampling rate at 720 MHz. A software and time control 1070 is used to control the AGC 1012, the multiband multicarrier down converter and demodulation 1020, and the A/D converter unit 1022. Using a digital receiver filter unit 1024 to remove out of band signals filters the digital signals of output of the A/D converter unit 1022. The output digital signals of the digital receiver filter unit 1024 are passed through a time-domain equalizer (TEQ) 1026. The TEQ 1026 is used to reduce the length of cyclic prefix to a more manageable number without reducing performance significantly. In other words, the TEQ 1026 can produce a new target channel with a much smaller effective constraint length when concatenated with the channel. Thus, the outputs of the TEQ 1026 in parallel are passed through a set of S/Ps from 1030*a* to 1030*k* to produce parallel digital sequences. Each of the S/Ps from 1030*a* to 1030*k* produces 1280 parallel digital sequences for each of guard removing units from 1032*a* to 1032*k*. The guard removing units from 1032*a* to 1032*k* remove 256 samples from the 1280 parallel digital sequences of the S/Ps from 1030a to 1030k to produce 1024 parallel digital sequences, which are used as inputs for FFT units from 1034a to 1034k. Each of the FFT units from 1034a to 1034k produces 512 frequency-domain signals that are used for frequency-domain equalizer (FEQ) units from 1036a to 1036k. The FEQ units from 1036a to 1036k are used to compensate for phase distortions, which are a result of phase offsets between sampling clocks in the transmitter and the receiver of the multiuser DSSS-OFDM multiband of UWB communication transceiver. This is because phases of the received outputs of the multiband FFT units from 1034a to 1034k are unlikely to be exactly the same as the phases of the transmitter symbols at the input to the IFFT units from 242a to 242k of the multiuser DSSS-OFDM multiband of base station UWB transmitter (as shown in FIG. 2). Thus, the outputs of the FEQ units from 1038a to 1038k are passed through a set of parallel-to-serial (P/S) units from 1038a to 1038k to produce a serial sequence for all of the eleven frequency bands. All of the serial sequences of the output of the P/S units from 1038a to 1038k, with each sequence length of M, are added together to produce a sequence length of 11M by using a multiband combination 1040 (detailed architecture as shown in FIG. 14). The output sequence of the multiband combination 1040 is passed through a despreading, deinterleaver, and decoding unit 1050. The despreading, deinterleaver, and decoding unit 1050 performs despreading, deinterleaving and decoding for the multiuser DSSS-OFDM multiband of UWB mobile communication receiver.

Figure 11:
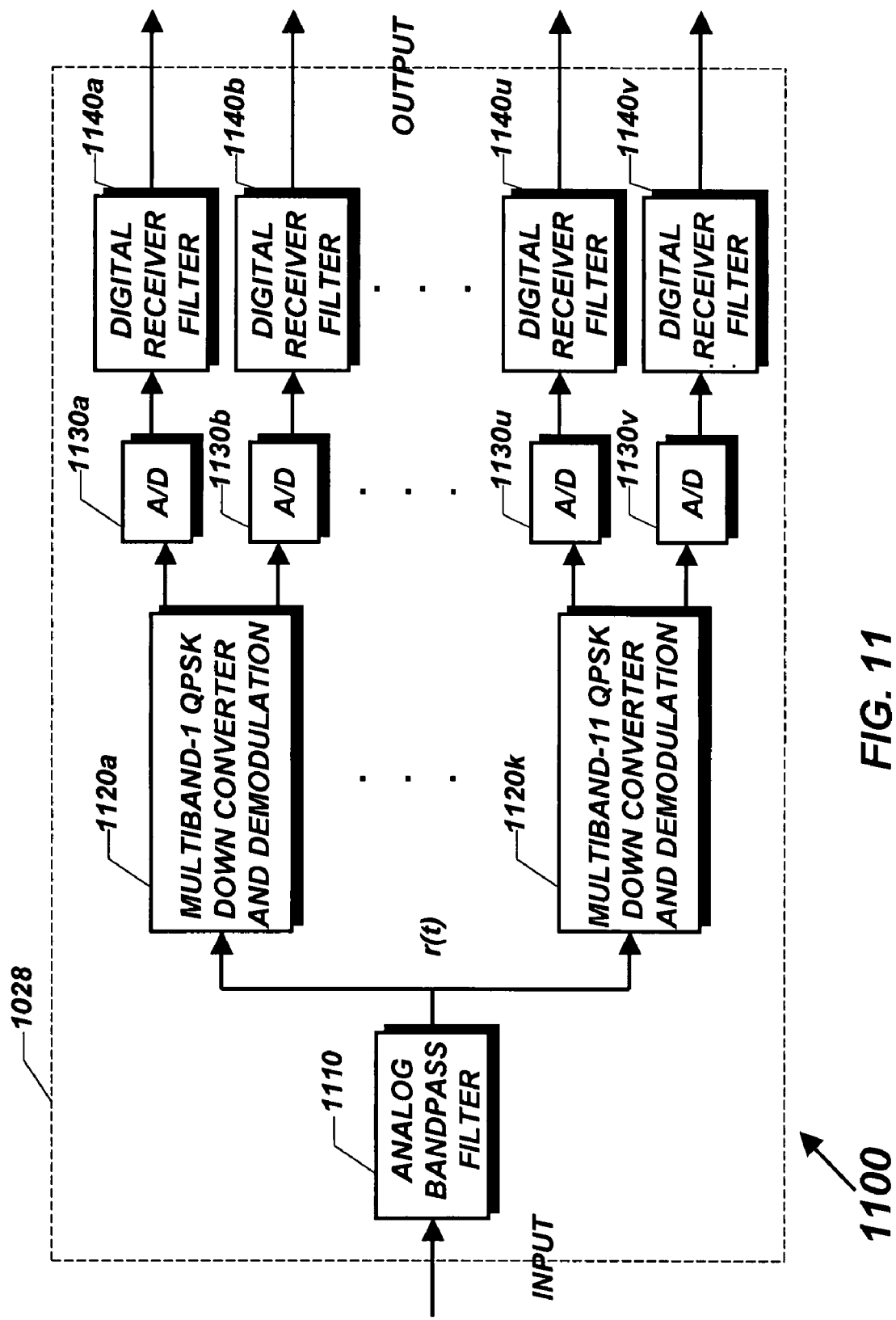
FIG. 11 is a detailed block diagram of a combination subsection including an analog bandpass filter, multiband QPSK down converters and demodulations, A/D converters, and digital receiver filters according to some embodiments.

Referring to FIG. 11 is a detailed block diagram 1100 of one combination subsection 1028 including an analog bandpass filter 1110, eleven multiband QPSK down converters and demodulations from 1120a to 1120k, twenty-two A/D converters from 1130a to 1130v, and twenty-two digital receiver filters from 1140a to 1140v according to some embodiments. The input signal of the AGC 1012 output (as shown in FIG. 10) is passed through the analog bandpass filter 1110, which is used to eliminate the out of band images. The output of analog signals of the analog bandpass filter 1110 is in parallel passed through the eleven multiband QPSK down converters and demodulations from 1120a to 1120k. Each of the multibands QPSK down converters and demodulations from 1120a to 1120k produces two analog signals as input signals for each of the A/D converters from 1130a to 1130v. The output digital signals of the A/D converters from 1130a to 1130v are in parallel passed through the digital receiver filters from 1140a to 1140k to produce the desired digital signals for a multiuser DSSS-OFDM multiband of UWB mobile receiver. All of the A/D converters from 1130a to 1130v use the same bit resolution and the same sampling rate. In a similar way, all of the digital receiver filters from 1140a to 1140v have the same filter attenuations and filter bandwidths with the same filter coefficients and a linear phase.

Figure 12:
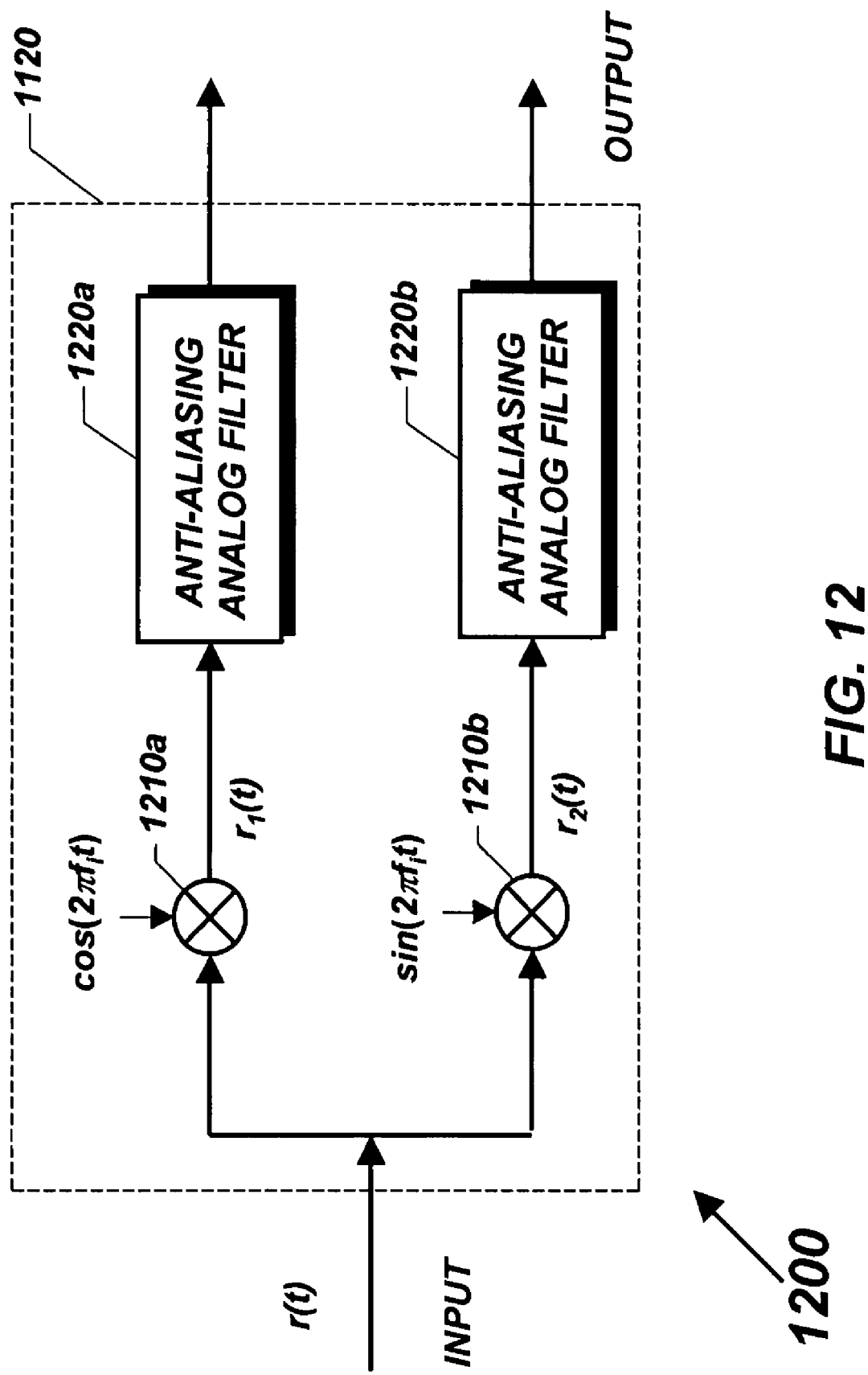
FIG. 12 is a detailed block diagram of a multiband QPSK demodulation and down converter according to some embodiments.

Referring to FIG. 12 is a detailed block diagram 1200 showing the multiband QPSK down converter and demodulation 1120 according to some embodiments. The input signal r(t) of the analog bandpass filter 1110 output is passed through two multipliers 1210a and 1210b at the same time. The analog signal r(t) is multiplied with $\cos(2\pi f_i t)$ by using the multiplier 1210a to produce an analog baseband signal $r_1(t)$. In the same way, the analog signal r(t) is multiplied with $\sin(2\pi f_i t)$ by using the multiplier 1210b to produce an analog baseband signal $r_2(t)$. Then anti-aliasing analog filters 1220a and 1220b sort both of the analog baseband signals $r_1(t)$ and $r_2(t)$ to produce the bandlimited analog signals for the A/D converters.

Figure 13:
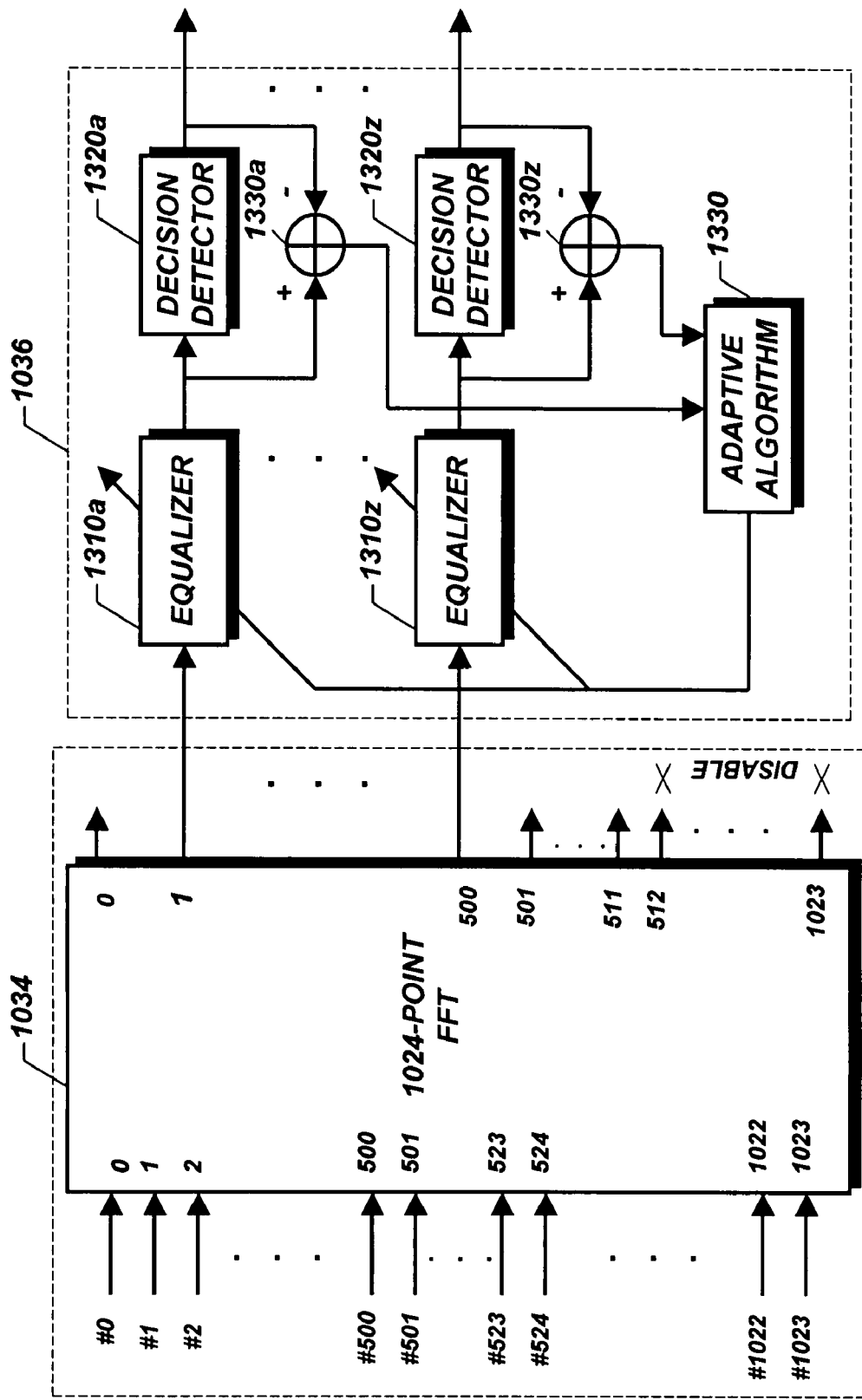
FIG. 13 is a detailed block diagram of a combination subsection including a fast Fourier transform (FFT) and frequency-domain equalizers (FEQ) according to some embodiments.

FIG. 13 is a detailed block diagram 1300 of a combination subsection including the FFT 1034 and the FEQ 1036 according to some embodiments. The FFT 1034 has a 1024-point input of a real-value and produces a 512-point complex data with labels from 0 to 511, while a 512-point complex data with labels from 511 to 1023 is disable. The FFT 1034 with labels from 0 to 511 also contains 12 Nulls. So, the FFT 1034 produces a 500-point complex data for the FEQ 1036. The FEQ 1036 contains 500 equalizers from 1310a to 1310z, 500 decision detectors from 1320a to 1320z, and 500 subtractions from 1330a to 1330z that operate in parallel. Each of the equalizers from 1310a to 1310z has a N-tap with an adaptive capability. Each of the decision detectors from 1320a to 1320z is a multi-level threshold decision. Each of the subtractions from 1330a to 1330z performs subtracting between the output of each of the equalizers from 1320a to 1320z and the output of each of the decision detectors from 1320a to 1320z. The output of each of the subtraction from 1330a to 1330z is referred to as an error signal, which is used to adjust the N-tap of the each of the equalizers from 1310a to 1310z by using an adaptive algorithm 1330.

The phases of the received outputs of the FFT 1034 do not have exactly the same as the phases of the transmitter symbols at the input to the IFFT units from 242a to 242k of the multiuser DSSS-OFDM multiband of UWB base station transmitter (as shown in FIG. 2). In addition, the phase responses have to be considered with the channel, which is coped with the TEQ 1026 (as shown in FIG. 10). Thus, the FEQ 1036 in FIG. 13 is used to compensate for the phase distortion that is a result of the phase offset between the sampling clocks in the transmitter and the receiver of the multiuser DSSS-OFDM multiband of UWB communication transceiver. The FEQ 1036 also offers an additional benefit of scaling the received signal before decoding. This is because the FEQ 1036 can be used to adjust a gain of the FFT 1034 output so that the decision detectors from 1320a to 1320z can be set the same parameters for all subchannels regardless of different subchannel attenuations.

FIG. 14 is a detailed block diagram 1400 of multiband combination (1040) according to some embodiments. The multiband combination (1040) includes a modular counter of 1410, eleven RAM memories from 1420a to 1420k, eleven up samples from 1430a to 1430k, and ten sample delays from 1440a to 1440j. Eleven input sequences in parallel are stored into the RAM memories from 1420a to 1240k. A row size of each of the RAM memories from 1420a to 1420k is 512 and the number of bits in each row can be programmed. The modular counter 1410 is used to control an address of the RAM memories from 1420a to 1420k for storing input sequences and sending out output sequences. The outputs of the RAM memories from 1420a to 1420k are interleaved each other to form a serial output sequence. The length size of the serial output sequence is 5,632 per segment, which is used for the despreading, deinterleaving, and decoding unit 1050 (as shown in FIG. 10).

Figure 15:
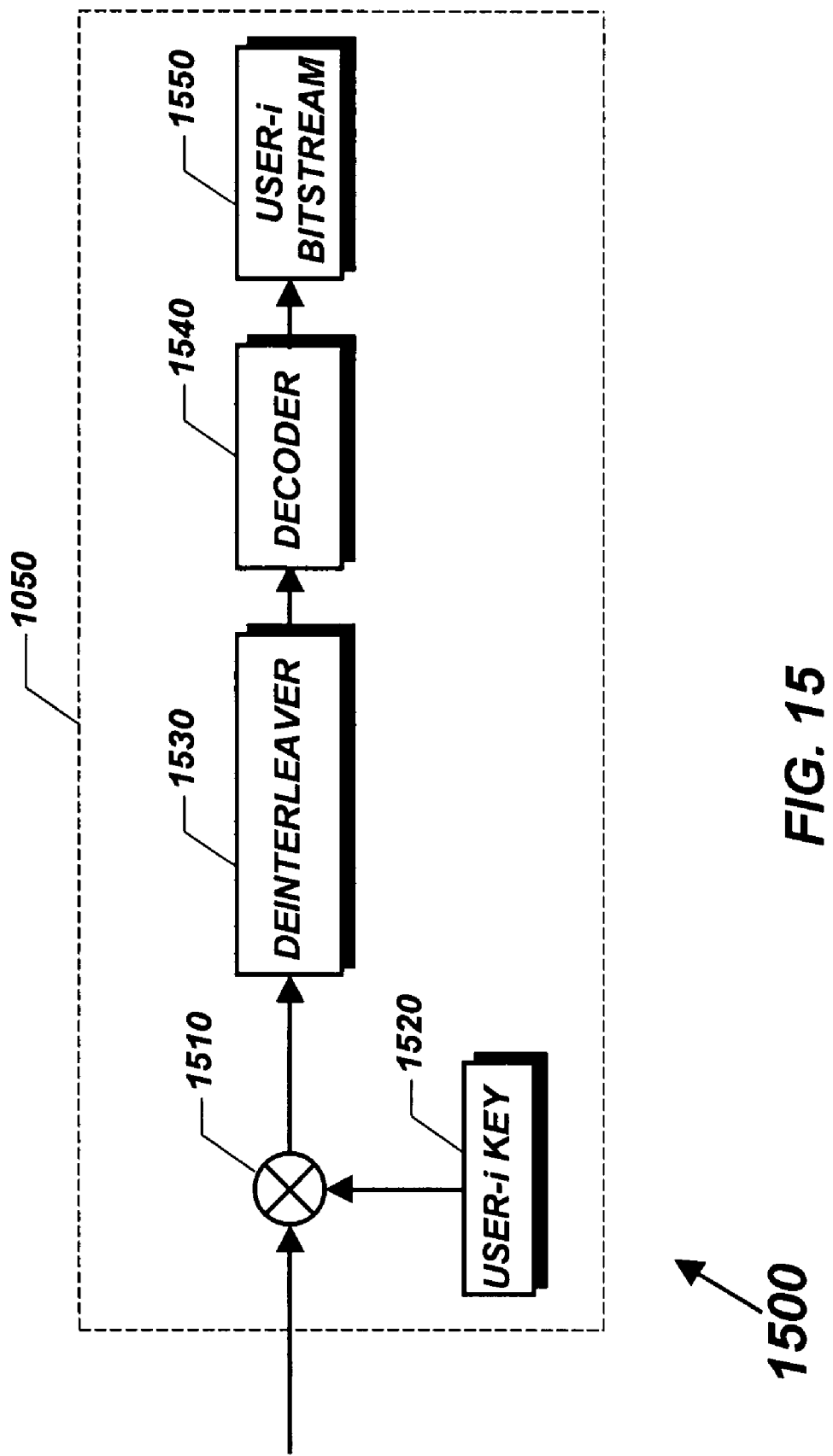
FIG. 15 is a detailed block diagram of a despreading, deinterleaver, and decoding unit for a single user of the UWB mobile communication receiver according to some embodiments.

Referring to FIG. 15 is a detailed block diagram 1500 of the despreading, deinterleaving, and decoding unit (1050) including a despreading 1510, an user-i key 1520, deinterleaver 1530, a decoding 1540, and a user-i bitstream 1550 according to one embodiment. The output sequences of the multiband combination (1040) are passed into the despreading 1510 by multiplying a spreading sequence of the user-i key 1520, which provides a unique key sequence. Cross correlations of the output sequences of the multiband combination (1040) and the unique key spreading sequence of the user-i key 1520 produce an encoded user-i data bitstream. This encoded user-i data bitstream is then deinterleaved by using the deinterleaver 1530 that is also coupled to the decoding 1540. The decoding 1540 decodes the encoded user-i data bitstream to produce an original transmitted user-i data bitstream that is stored in the user-i bitstream 1550.

While the present invention has been explained with respect to a limited number of embodiments, those skilled in the art will appreciate numerous modifications and variations therefrom. The appended claims cover all such modifications and variations as fall within the true spirit and scope of the present invention.

What is claimed is:

1. A multiuser direct sequence spread spectrum (DSSS) orthogonal frequency division multiplexing (OFDM) multiband of ultra wideband (UWB) communication system comprising:
    N UWB mobile stations, where N is an integer and greater than 1;
    an UWB basestation coupled to an UWB network interface that is connected to an UWB network;
    said UWB basestation further including P convolution encoders, P interleavers, P multipler modules, P user keys, a summation, a multiband splitter, M serial-to-parallel (S/P) converters, an inverse fast Fourier transforms (IFFT) unit, M guards, M filtering units, a multiband multicarrier modulation, and a power amplifier (PA), where P and M are integers and greater than 1;
    said summation is a block-based operation;
    said P user keys generating P different sequences;
    each of said P user keys spreading with each output of said P interleavers by each of said P multipler modules;
    said UWB basestation receiving N different UWB signals from said N UWB mobile stations;
    said UWB basestation transmitting N user's UWB signals containing N different user keys to N UWB mobile stations; and
    each of said N UWB mobile stations transmitting UWB signals including one user key to said UWB basestation.

2. The multiuser DSSS OFDM multiband of UWB communication system of claim 1 wherein each of said P user keys is a unique pseudorandom (PN) sequence.

3. The multiuser DSSS OFDM multiband of UWB communication system of claim 2 wherein each of the P user keys represents a password for a user.

4. The multiuser DSSS OFDM multiband of UWB communication system of claim 3 wherein a cross-correlation between one user key and other user keys is almost equal to zero value.

5. The multiuser DSSS OFDM multiband of UWB communication system of claim 1 wherein said multiband splitter further including ten sample delay units, eleven down sample units, eleven random access memory (RAM) units, and a modular counter.

6. The multiuser DSSS OFDM multiband of UWB communication system of claim 5 wherein said multiband splitter converts an N length of a serial sequence into eleven multiband sequences with a length of N/11, where N is equal to 11B and B is an integer and greater than 1.

7. The multiuser DSSS OFDM multiband of UWB communication system of claim 1 wherein said IFFT unit further having eleven independent and identical IFFT structures that are operated in parallel.

8. The multiuser DSSS OFDM multiband of UWB communication system of claim 1 wherein each of said M filtering units further having a dual-switch, two transmitter shaped filters, two digital-to-analog (D/A) converters, two analog reconstruction filters, and a bit detector.

9. The multiuser DSSS OFDM multiband of UWB communication system of claim 8 wherein said dual-switch further comprising two switches, one switch of said two switches rotating at even number of input positions and another switch of said two switches rotating at odd number of input positions sequentially.

10. The multiuser DSSS OFDM multiband of UWB communication system of claim 8 wherein said bit detector is used to identify output values of the dual-switch.

11. The multiuser DSSS OFDM multiband of UWB communication system of claim 1 wherein said multiband multicarrier modulation further including eleven bit detectors, eleven multiband quadrature phase-shifted keying (QPSK) modulations, a summation, and an analog bandpass filter.

12. The multiuser DSSS OFDM multiband of UWB communication system of claim 11 wherein said each of eleven multiband QPSK modulations further having a multi-oscillator, two oscillator switches, an QPSK switch, a bit detector, an even-sequence-based mixer, and an odd-sequence-based mixer.

13. The multiuser DSSS OFDM multiband of UWB communication system of claim 12 wherein said multi-oscillator further comprising positive and negative carriers $\sin(2\pi f_i t)$, and positive and negative carriers $\cos(2\pi f_i t)$.

14. The multiuser DSSS OFDM multiband of UWB communication system of claim 12 wherein one of the two oscillator switches connects to either the positive $\cos(2\pi f_i t)$ or the negative $\cos(2\pi f_i t)$ and another of the two oscillator switches connects to either the negative $\sin(2\pi f_i t)$ or the positive $\sin(2\pi f_i t)$ at the same time.

15. The multiuser DSSS OFDM multiband of UWB communication system of claim 12 wherein said QPSK switch connects to either the even-sequence-based mixer or odd-sequence-based mixer.

16. The multiuser DSSS OFDM multiband of UWB communication system of claim 11 wherein each of said eleven bit detectors controls each of said eleven multiband QPSK modulations.

17. The multiuser DSSS OFDM multiband of UWB communication system of claim 12 wherein said bit detector controls said two oscillator switches and said QPSK switch.

18. The multiuser DSSS OFDM multiband of UWB communication system of claim 12 wherein one of the two oscillator switches connects to the positive $\cos(2\pi f_i t)$ if the bit detector identifies "00" bits from output of the dual-switch.

19. The multiuser DSSS OFDM multiband of UWB communication system of claim 12 wherein one of the two oscillator switches connects to the negative $\cos(2\pi f_i t)$ if the bit detector identifies "10" bits from outputs of the dual-switch.

20. The multiuser DSSS OFDM multiband of UWB communication system of claim 12 wherein another of the two oscillator switches connects to the negative $\sin(2\pi f_i t)$ if the bit detector identifies "01" bits from the outputs of the dual-switch.

21. The multiuser DSSS OFDM multiband of UWB communication system of claim 12 wherein another of the two oscillator switches connects to the positive $\sin(2\pi f_i t)$ if the bit detector identifies "11" bits from the outputs of the dual-switch.

22. The multiuser DSSS OFDM multiband of UWB communication system of claim 12 wherein said QPSK switch connects to an output of said even-sequence-based mixer if said bit detector identifies "00" or "10" bits from said outputs of said dual-switch.

23. The multiuser DSSS OFDM multiband of UWB communication system of claim 12 wherein said QPSK switch connects to an output of said odd-sequence-based mixer if said bit detector identifies "01" or "11" bits from said outputs of said dual-switch.

24. The multiuser DSSS OFDM multiband of UWB communication system of claim 12 wherein outputs of said QPSK switch are a QPSK modulated data sequence.

* * * * *